US010230436B2

(12) United States Patent
Liang et al.

(10) Patent No.: US 10,230,436 B2
(45) Date of Patent: Mar. 12, 2019

(54) METHODS FOR CHANNEL INFORMATION ACQUISITION, SIGNAL DETECTION AND TRANSMISSION IN MULTI-USER WIRELESS COMMUNICATION SYSTEMS

(71) Applicant: Ping Liang, Irvine, CA (US)

(72) Inventors: Ping Liang, Newport Coast, CA (US); Dengkui Zhu, Wanyuan (CN); Boyu Li, Irvine, CA (US)

(73) Assignee: RF DSP INC., Irvine, CA (US)

( * ) Notice: Subject to any disclaimer, the term of this patent is extended or adjusted under 35 U.S.C. 154(b) by 120 days.

(21) Appl. No.: 15/504,146

(22) PCT Filed: Oct. 20, 2015

(86) PCT No.: PCT/US2015/056500
§ 371 (c)(1),
(2) Date: Feb. 15, 2017

(87) PCT Pub. No.: WO2016/064901
PCT Pub. Date: Apr. 28, 2016

(65) Prior Publication Data
US 2017/0250740 A1 Aug. 31, 2017

Related U.S. Application Data

(60) Provisional application No. 62/065,775, filed on Oct. 20, 2014.

(51) Int. Cl.
H04B 7/0452 (2017.01)
H04L 5/00 (2006.01)
H04W 72/04 (2009.01)

(52) U.S. Cl.
CPC ......... H04B 7/0452 (2013.01); H04L 5/0007 (2013.01); H04L 5/0048 (2013.01);
(Continued)

(58) Field of Classification Search
CPC ... H04B 7/0452; H04L 5/0007; H04L 5/0051; H04L 5/0048; H04W 72/042
See application file for complete search history.

(56) References Cited

U.S. PATENT DOCUMENTS

2011/0116436 A1 5/2011 Bachu et al.
2011/0134859 A1 6/2011 Li et al.
(Continued)

FOREIGN PATENT DOCUMENTS

CN 102598537 B 7/2012

OTHER PUBLICATIONS

International Preliminary Report on Patentability (Chapter I of Patent Cooperation Treaty)—Written Opinion of the International Searching Authority for PCT/US15/56500.

Primary Examiner — Gary Mui
(74) Attorney, Agent, or Firm — Guosheng Wang; United States Research and Patent Firm

(57) ABSTRACT

This invention presents methods for signal detection and transmission in MU-MIMO wireless communication systems, for multiple UEs transmit uplink SRS to capture the uplink channel coefficients, and to estimate the frequency offsets and time offsets, for the BS estimating the channel coefficients of multiple UEs with the received SRS, for the BS estimating the frequency offsets and time offsets of multiple UEs with the estimated channel coefficients, for the BS modifying the estimated channel coefficients with the estimated frequency offsets and time offsets, for the BS calculating the detection matrices for the uplink MU-MIMO signal detection with the modified channel coefficients and for the BS calculating the precoding matrices for the downlink MU-MIMO signal transmission.

4 Claims, 13 Drawing Sheets

(52) U.S. Cl.
CPC ......... *H04L 5/0051* (2013.01); *H04W 72/042* (2013.01); *H04W 72/0446* (2013.01)

(56) References Cited

U.S. PATENT DOCUMENTS

| | | |
|---|---|---|
| 2011/0211661 A1 | 9/2011 | Valadon |
| 2013/0022090 A1 | 1/2013 | Weng et al. |
| 2013/0077514 A1 | 3/2013 | Dinan |
| 2013/0077543 A1 | 3/2013 | Kim et al. |
| 2013/0194931 A1 | 8/2013 | Lee et al. |
| 2013/0208608 A1 | 8/2013 | Piazza et al. |
| 2014/0098696 A1 | 4/2014 | Park |
| 2014/0192917 A1 | 7/2014 | Nam et al. |
| 2014/0302796 A1 | 10/2014 | Gormley et al. |
| 2017/0187504 A1* | 6/2017 | Qian ........................ H04L 5/00 |

\* cited by examiner

METHODS FOR CHANNEL INFORMATION ACQUISITION, SIGNAL DETECTION AND TRANSMISSION IN MULTI-USER WIRELESS COMMUNICATION SYSTEMS

This application claims the benefit of U.S. Provisional Application No. 62/065,775, filed on Oct. 20, 2014.

FIELD OF INVENTION

The field of the invention is wireless communication, and more specifically is related to methods for channel information acquisition, signal detection and transmission in Multi-User (MU) wireless communication systems, and in particular to strategies of channel information acquisition, signal detection and transmission in massive MU Multiple-Input Multiple-Output (MU-MIMO) systems.

BACKGROUND

Massive MIMO systems scale up conventional MIMO systems by possibly orders of magnitude, e.g., to hundreds of antennas at a Base-Station (BS), to simultaneously serve tens of User Equipments (UEs) in the same time-frequency resource. With the capabilities of aggressive spatial multiplexing and large array gains, a massive MIMO system can achieve great capacity increase [1]-[3]. In addition, it could be built with inexpensive low-power components. It also has the potential of reducing the latency of the air interface, simplifying the media access layer, as well as increasing the robustness to both unintentional artificial interference and intended jamming. In general, massive MIMO systems are considered in Time-Division Duplex (TDD) mode, taking advantages of the channel reciprocity between the uplink and downlink. Channel estimation using reciprocity in Frequency-Division Duplex (FDD) massive MIMO is possible by the methods described in our provisional patent application 61/919,032 "Method for Acquiring Channel State Information In FDD MIMO Wireless Networks" filed on Dec. 20, 2013. Moreover, Orthogonal Frequency-Division Multiplexing (OFDM) is still the prevalent technology to multiplex UEs for the whole bandwidth as the $4^{th}$ Generation (4G) LTE communication systems and is well suited for MIMO systems. Massive MIMO with OFDM could increase spectrum efficiency more than ten times of the conventional systems with relatively simple implementation.

When MU-MIMO is employed in conventional TDD communication systems, e.g., 3GPP LTE/LTE-A, the Sounding Reference Signal (SRS) transmitted by a UE is mainly used by the BS to measure the wireless channel coefficients between itself and the UE. Then, the estimated channel coefficients are used to compute the precoding matrices for downlink data transmission. For the uplink signal detection, the BS has to estimate the channel coefficients between itself and UEs based on the received pilot signals specifically for data demodulation first, e.g., Demodulation Reference Signal (DMRS). Then, it computes the detection matrix on each radio resource unit to separate the signals belonging to each UE from the received signals, in which the signals from multiple UEs are superposed. However, this process is not feasible in a massive MIMO system. The reason is that as the numbers of receiving antennas and multiplexed UEs are increased to hundreds and more than ten respectively, the computation of detection matrices requires huge hardware resources, especially when the system bandwidth is large, e.g., 20 MHz. As a result, it increases cost and causes unacceptable processing delay which cannot meet the typical requirement of Radio Access Network (RAN). Hence, a whole new uplink signal detection process is provided in this patent for massive MIMO systems to ensure that the performance of uplink transmission is no worse than conventional systems, while the process delay is reduced to meet the requirement of RAN. FIG. 1 illustrates a typical MU-MIMO communication system in the uplink, where the BS 1 communicates with three UEs 2, UE1, UE2, and UE3, at the same time with the same frequency resource. Take one specific resource unit as an example, after passing through three different wireless channels 3, $h_1$, $h_2$, and $h_3$, signals $s_1$, $s_2$, and $s_3$ transmitted by the three UEs respectively are superposed at the BS's receiving antennas. Combining the receiver noise n and the neighboring cell interference I, the received signals by the BS can be modeled as $y=h_1 s_1 + h_2 s_2 + h_3 s_3 + n + I$. FIG. 2 provides the process of signal detection in conventional MU-MIMO communication systems. It begins 4 when the BS estimates the channel vector of each UE in the MU-MIMO group on a specific radio resource for data transmission through the pilots inserted in the data region 5. Then, the BS calculates the detection matrix of the specific radio resource 6. After that, the BS applies the detection matrix to separate the data belonging to each UE in the MU-MIMO group 7 and the process ends 8.

The antennas of massive MIMO systems can be distributed in two ways. The first one is centralized antenna systems, where all antennas are located in one place and it needs large space to fix the huge antenna array if the carrier frequency is relative small, e.g., 2 GHz. The second one is distributed antenna systems, where all antennas are divided into several groups and each group is fixed at a different place. The Radio Frequency (RF) signals of these groups can be passed to the baseband through fibers or other interfaces. FIG. 3 illustrates a centralized antenna system where a BS 1 with a large number of antennas 9 and a centralized baseband processor 10 communicates with multiple UEs 2 simultaneously. FIG. 4 illustrates a distributed antenna system where three remote radio heads 11 with their own antenna arrays 9 respectively is connected to a common baseband processor 10 through fibers 12 and communicate with multiple UEs 2 simultaneously.

This invention presents embodiments that provide the signal transmission and detection methods as well as the relative processes for the downlink and uplink transmission in massive MIMO systems.

SUMMARY

This invention provides universal channel acquisition, signal detection and transmission methods and processing flowcharts that could be implemented in massive MIMO systems to improve system performance. It is an object of this invention to provide a new uplink signal detection process for massive MIMO systems. The other object of this invention is to present methods to combat the frequency and time offsets when detecting signals of multiple UEs.

In order to detect data signals of multiple UEs in the uplink transmission, the BS has to estimate the channel coefficients of each UE by employing some specific pilot signals, e.g., Sounding Reference Signal (SRS), before a UE transmits data to the BS. When estimating the channel coefficients, the BS also needs to estimate the frequency offset and time offset of each UE. With the estimated frequency and time offset values, the BS modifies the estimated channel coefficients and computes the effective channel vector for each UE. Then, the BS computes the detection matrix for the multiplexed UEs with the effective channel vectors when receiving data signals. After that, it modifies the detection matrix by compensating the frequency and time offsets. Finally, the detection matrix is applied to separate the data signals belonging to each UE.

BRIEF DESCRIPTION OF THE DRAWINGS

The aforementioned implementation of the invention as well as additional implementations would be more clearly understood as a result of the following detailed description of the various aspects of the invention when taken in conjunction with the drawings. Like reference numerals refer to corresponding parts throughout the several views of the drawings.

DETAILED DESCRIPTION OF THE PREFERRED EMBODIMENTS

Figure 1:
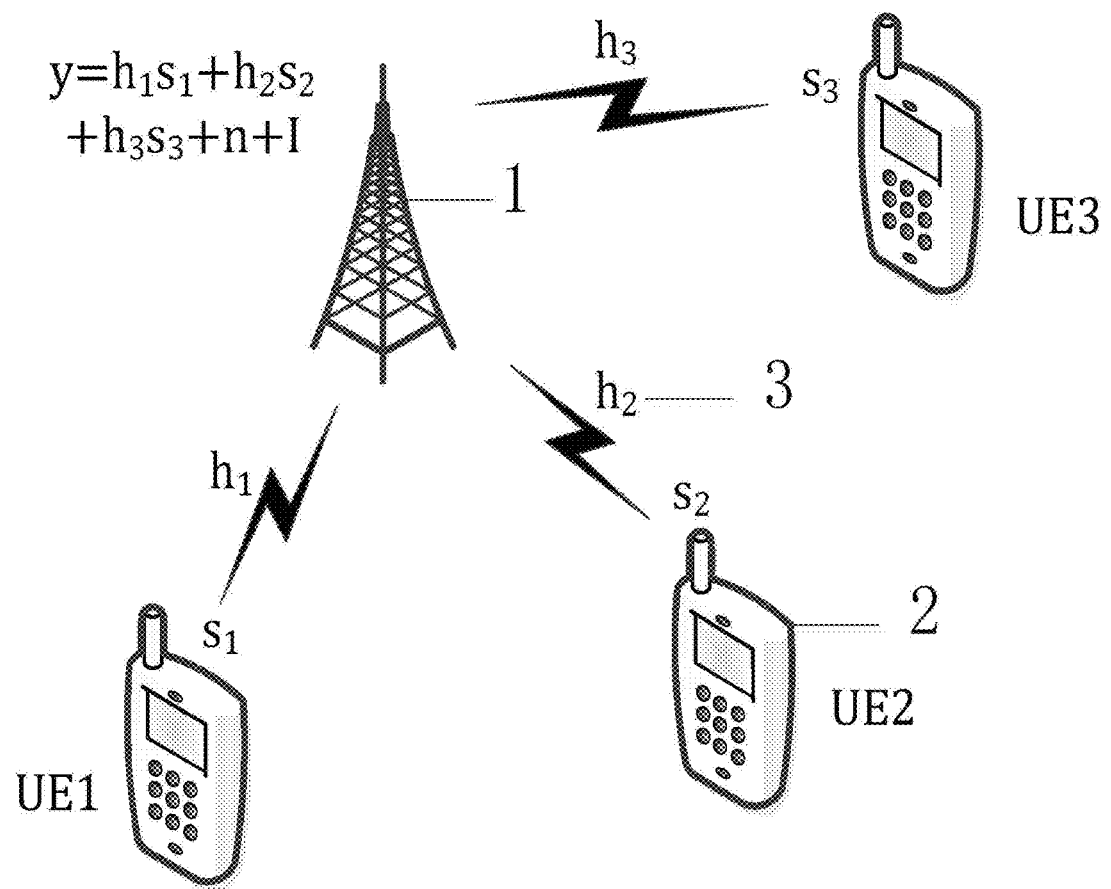
FIG. 1 illustrates a typical MU-MIMO communication system.
Figure 2:
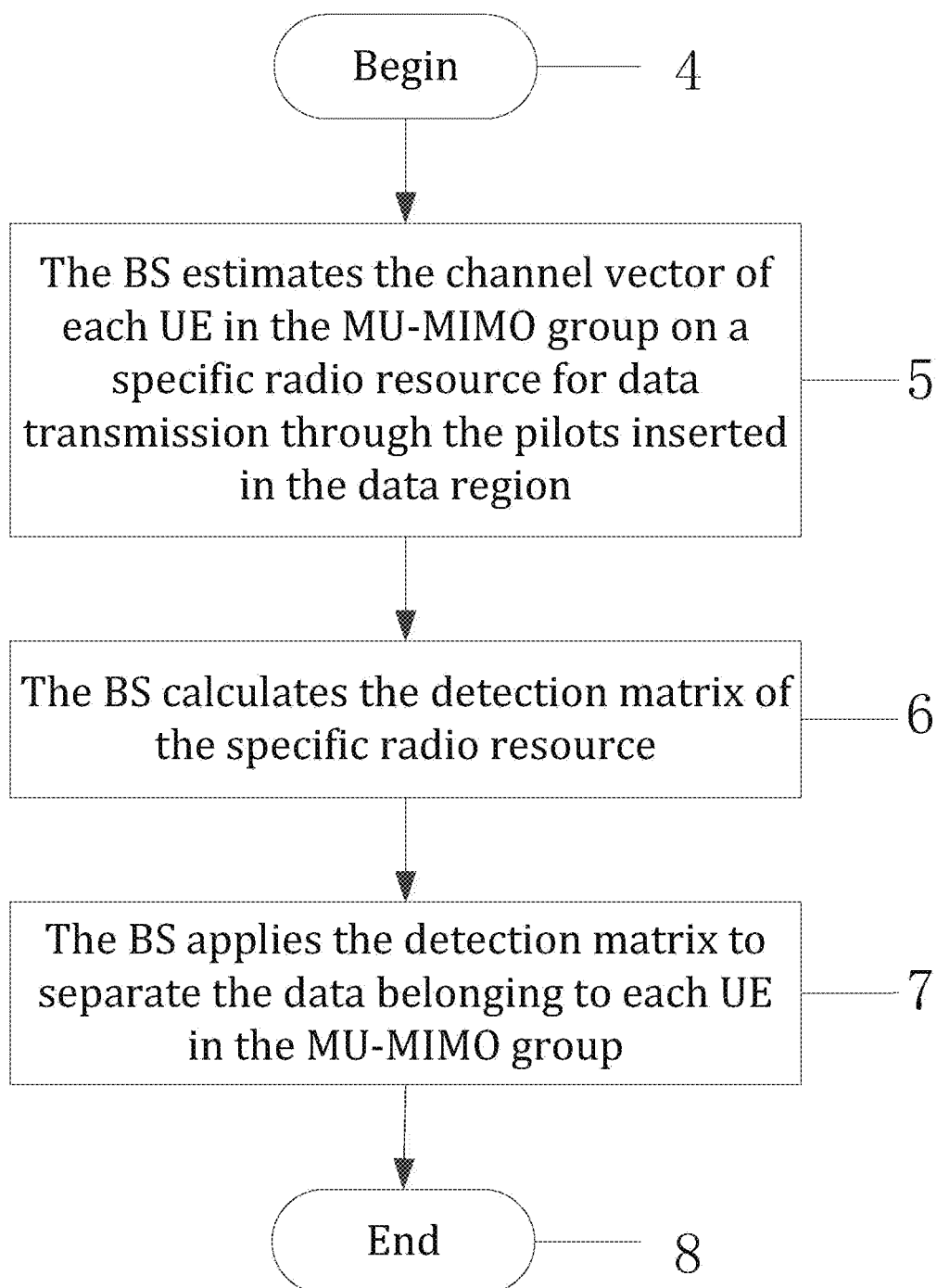
FIG. 2 illustrates a method for signal detection in conventional communication systems.
Figure 3:
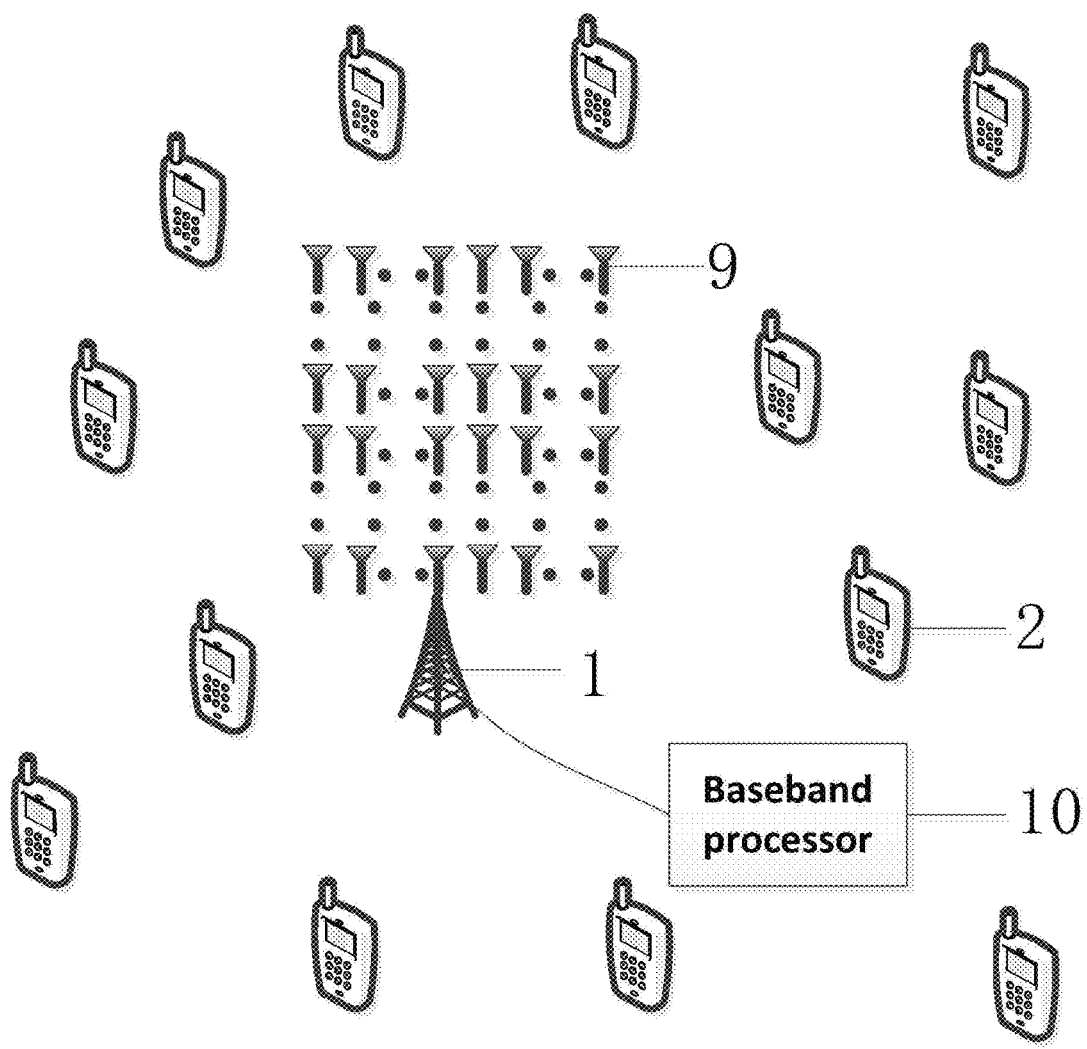
FIG. 3 illustrates a centralized antenna MIMO system.
Figure 4:
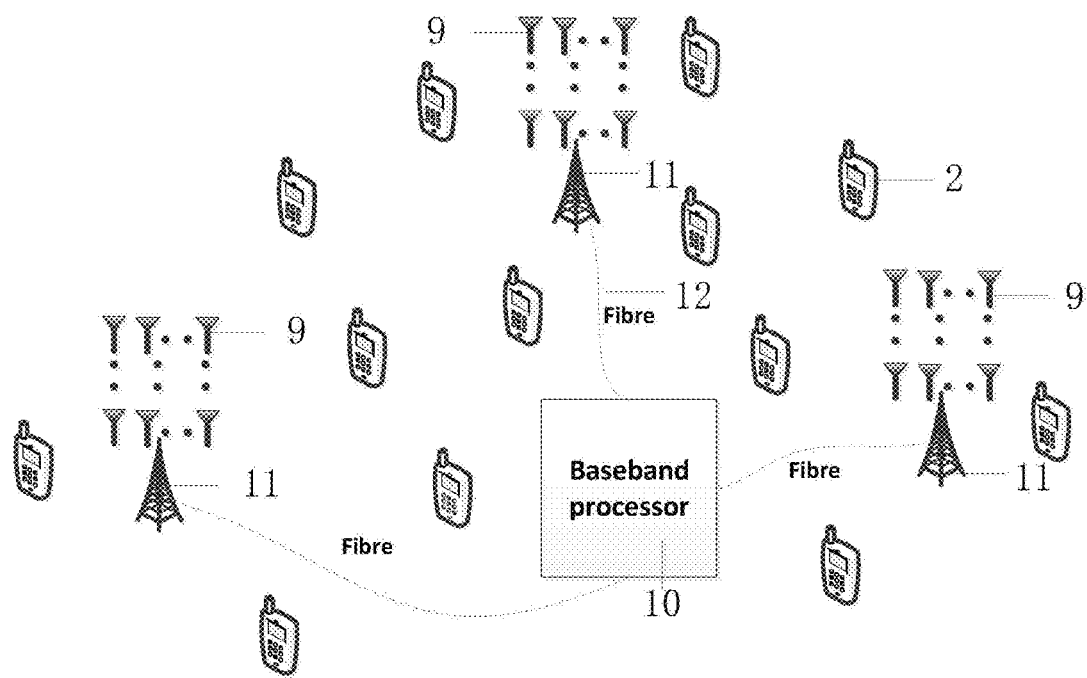
FIG. 4 illustrates a distributed antenna MIMO system with three groups of antennas.
Figure 5:
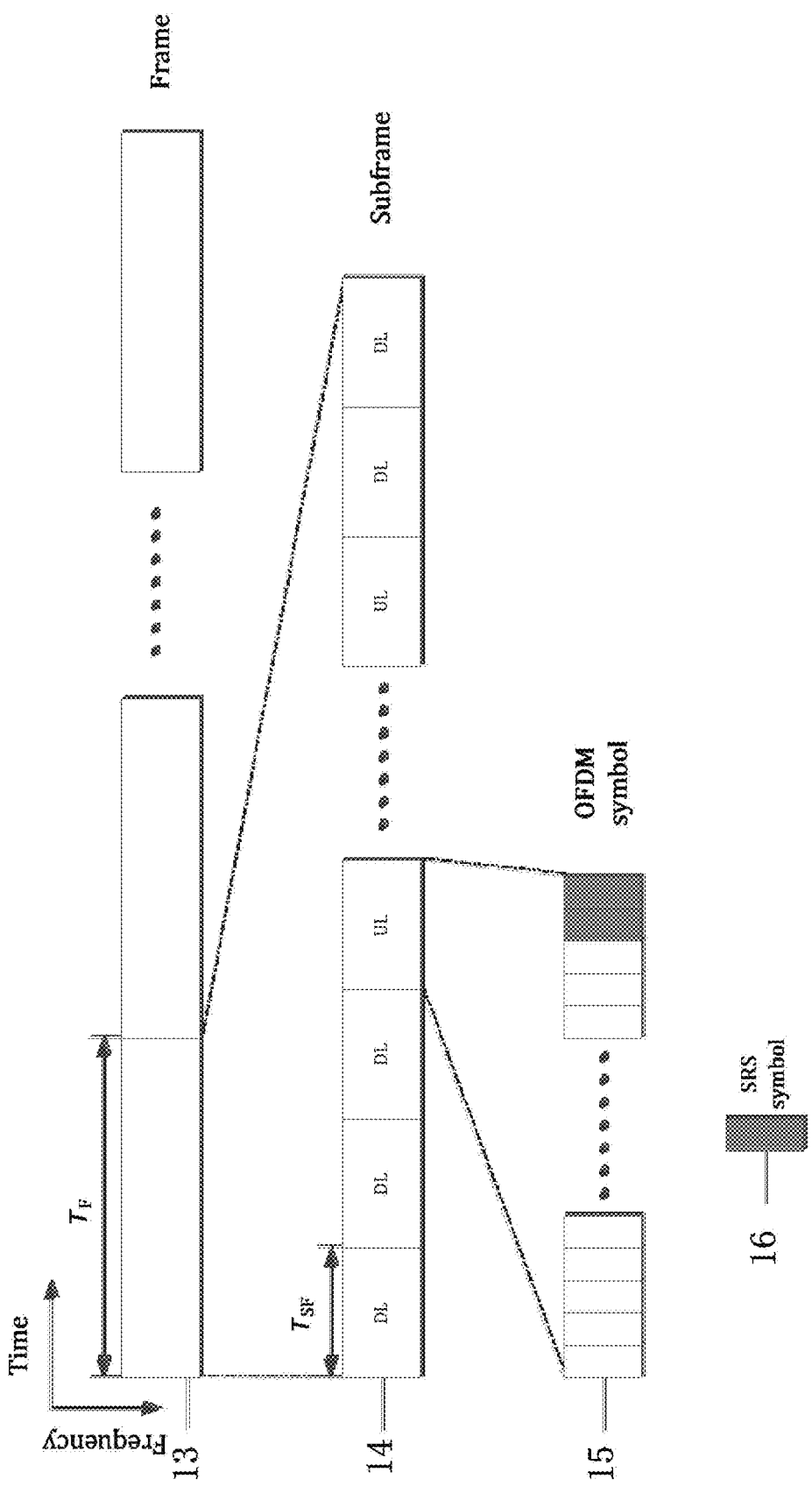
FIG. 5 illustrates a structure of the radio time-frequency resource.
Figure 6:
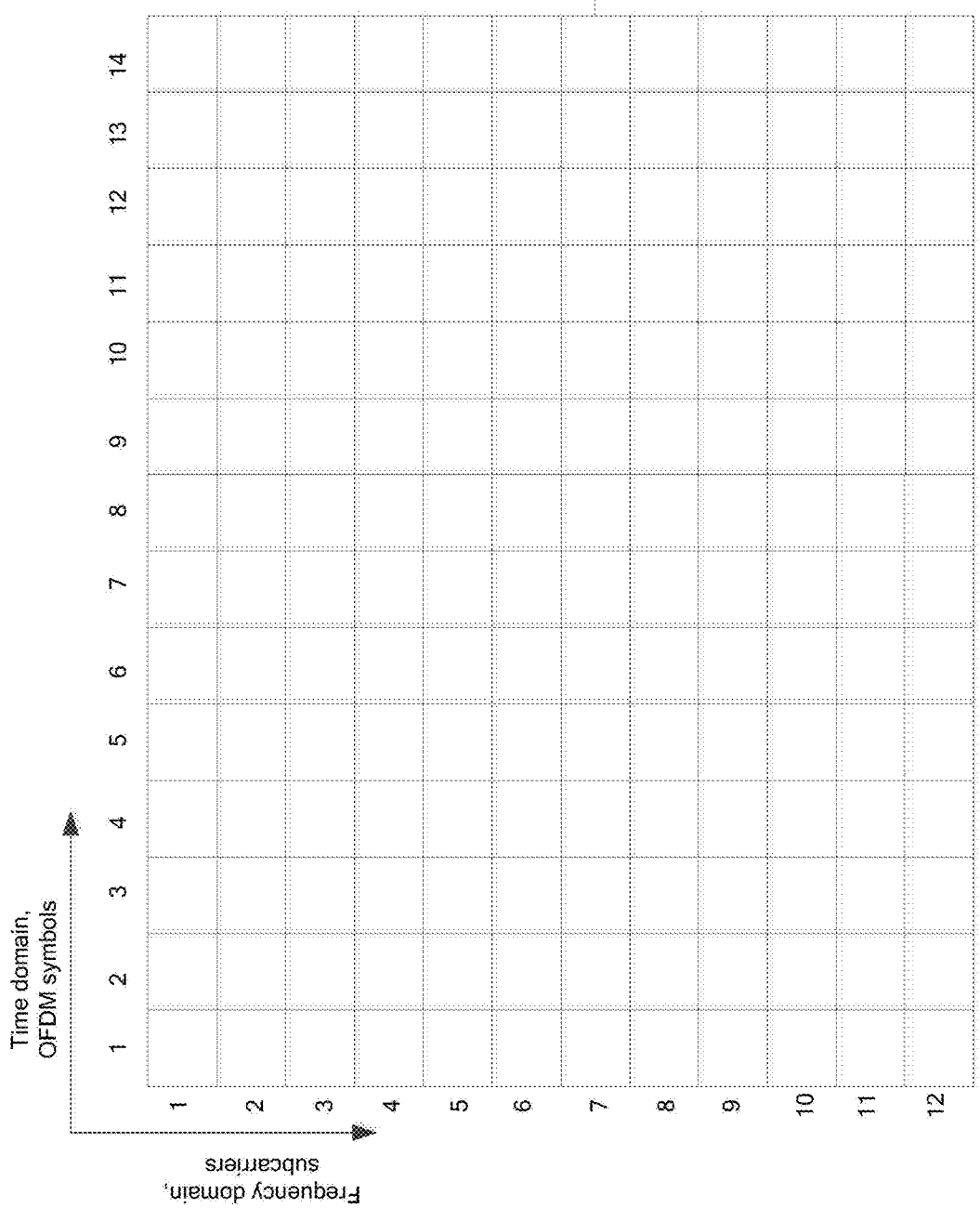
FIG. 6 illustrates a structure of a resource block.

For a massive MU-MIMO OFDM communication system, where the TDD mode is employed, the radio resource allocation in the time and frequency domains for the uplink and downlink is shown in FIG. 5. In this figure, the resource is organized in frame units 13 consisted of the whole bandwidth in the frequency domain and a consecutive time duration denoted by $T_F$ in the time domain. One frame is divided into N subframes 14 further, among which $N_1$ and $N_2 = N - N_1$ subframes are reserved for the downlink and uplink transmission respectively. Note that the numbers and the indices of downlink and uplink subframes are configurable in a frame. One subframe is consisted of $N_{sym}$ OFDM symbols 15 in the time domain and two symbols 16 are reserved for SRS transmission. FIG. 5 shows an example of the frame and subframe structures. One subframe is consisted of multiple Resource Blocks (RBs), where one RB is consisted of $N_{sc}$ consecutive subcarriers in the frequency domain, e.g., $N_{sc}=12$ in 3GPP-LTE/LTE-A, and all OFDM symbols in a time duration, e.g., a subframe. One subcarrier in a OFDM symbol is called a Resource Element (RE) and is the smallest data transmission unit. FIG. 6 shows an example of the RB structure 17, where $N_{sc}=12$ and $N_{sys}=14$, and a square denotes one RE. For the uplink data transmission, K UEs in a MU-MIMO group are multiplexed in parts or the whole of RBs in a subframe.

The SRS may be sent in any uplink subframe. The number of OFDM symbols for SRS in a subframe is configurable, e.g., one or two or even a whole subframe. The SRS symbol indices in a subframe may be continuous or discontinuous. As shown in the example of FIG. 5, SRS occupies the last two symbols of the first uplink subframe of the frame.

In the frequency domain, a subset or the whole of usable subcarriers can be allocated to one UE for SRS. Multiple UEs can be multiplexed on the same subset of allocated subcarriers through orthogonal sequences or semi-orthogonal sequences.

Figures 7, 8:
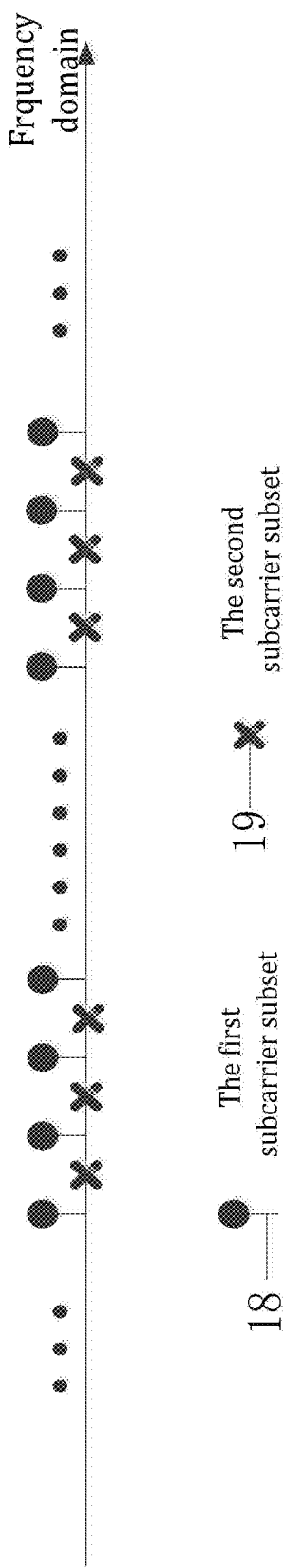
FIG. 7 illustrates the subcarrier subsets when one symbol is reserved for SRS.
FIG. 8 illustrates the estimated channel between the $m^{th}$ receiving antenna and the $k^{th}$ UE when one symbol is reserved for SRS.

One or two OFDM symbols can be allocated to a UE for SRS transmission when SRS symbols are reserved in a subframe. FIG. 7 shows an example where all usable subcarriers are divided into two subsets. A total of $M_{srs}$ UEs are allocated to the first subset 18 to transmit SRS, while the other $M_{srs}$ UEs are allocated to the second subset 19.

If a UE is allocated one OFDM symbol to transmit SRS in a specific subframe, the BS would estimate the channel coefficients between itself and the UE and the time offset of the UE. The $k^{th}$ UE in the first subcarrier subset in FIG. 7 is used to illustrate an example of SRS transmission, where usable subcarriers are divided into two subsets for SRS transmission and K UEs are multiplexed in each subset. Suppose that the subset has $N_p$ subcarriers denoted by $\Omega_k = \{i_1, \ldots, i_{N_p}\}$. FIG. 8 shows the channel coefficient between the $m^{th}$, m=1, ... M, receiving antenna of the BS and the transmitting antenna of the $k^{th}$ UE, where we assume that each UE has a single transmitting antenna. Similarly to FIG. 7, a total of $M_{srs}$ UEs are allocated to the first subset 18 to transmit SRS, while the other $M_{srs}$ UEs are allocated to the second subset 19. When the BS receives signals on allocated subcarriers, it estimates the channel coefficient as $\tilde{H}_{m,k,l}$, l=1, ..., $N_p$, and m=1, ..., M, on the $l^{th}$ subcarrier of $\Omega_k$ by using the methods such as in [5]. In order to estimate the time offset, the BS first computes the correlation value. Two cases are considered below.

For the centralized antenna MIMO systems, i.e., all antennas of the BS are located in one place, the correlation value is $$R_{TO,k} = \sum_{m=1}^{M} \sum_{l=1}^{N_p - \Delta} \tilde{H}^*_{m,k,l} \tilde{H}_{m,k,l+\Delta}, \quad (1)$$

where $\tilde{H}^*_{m,k,l}$ is the conjugate of $\tilde{H}_{m,k,l}$ and $\Delta$ is a positive integer, e.g., 1 or 2. Then, the BS estimates the equivalent phase of time offset as $$\hat{\theta}_{TO,k} = \beta \arg(R_{TO,k}), \quad (2)$$

where $\beta$ is a scaling factor and can be chosen as $$\frac{N_{fft}}{2\pi\Delta},$$

with $\Delta = i_{l+1} - i_l$ and $N_{fft}$ being the size of Fast Fourier Transform (FFT), and arg(•) denotes the phase of the input complex-valued number. Note that here the unit of the phase is radian if $\beta$ is chosen as $$\frac{N_{fft}}{2\pi\Delta}.$$

For the distributed antenna MIMO systems, i.e., all antennas of the BS are divided into $N_{DA}$ groups, where each group is located at a different place, then the time offset of each group of antennas needs to be estimated individually. For the $n_{DA}{}^{th}$ group, the correlation value is $$R_{TO,k}^{n_{DA}} = \sum_{m \in \Omega_{n_{DA}}} \sum_{l=1}^{N_p-\Delta} \tilde{H}_{m,k,l}^* \tilde{H}_{m,k,l+\Delta}, n_{DA} = 1, \ldots, N_{DA}, \quad (3)$$

and the equivalent phase of time offset is estimated as $$\hat{\theta}_{TO,k}{}^{n_{DA}} = \beta \arg(R_{TO,k}{}^{n_{DA}}), n_{DA}=1, \ldots, N_{DA}, \quad (4)$$

where $\Omega_{n_{DA}}$ represents the index subset of antennas belonging to the $n_{DA}{}^{th}$ antenna group.

If a UE is allocated more than one OFDM symbols to transmit SRS in a specific subframe, the BS would estimate the channel coefficient between itself and the UE and also estimate the frequency and time offsets of the UE.

Figure 9:
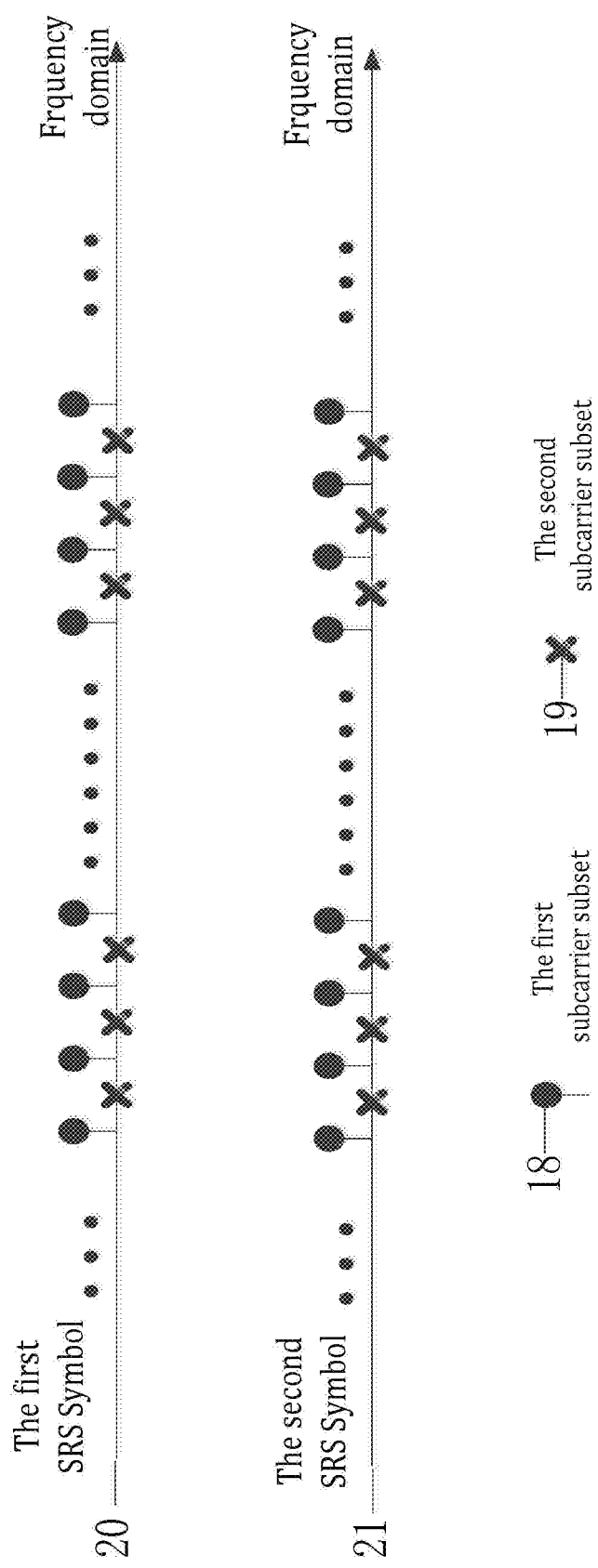
FIG. 9 illustrates the subcarrier subsets when two symbols are reserved for SRS.
Figure 10:
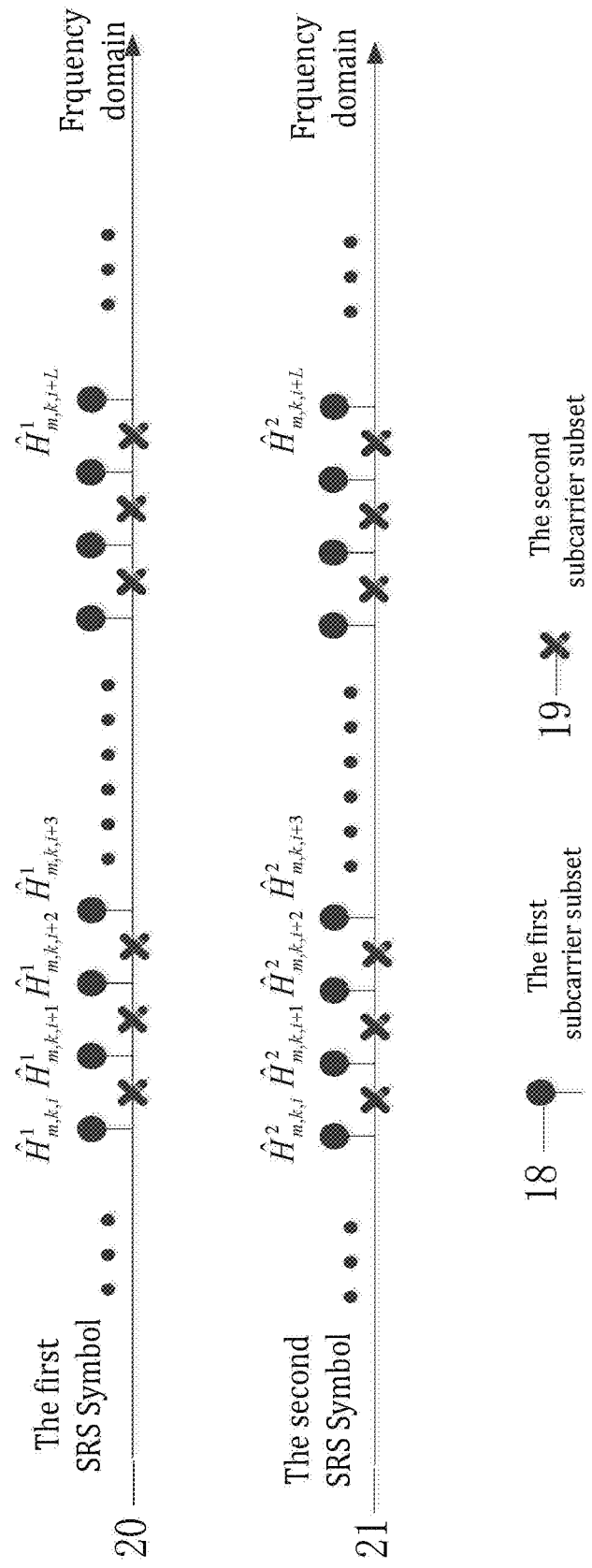
FIG. 10 illustrates the estimated channel between the $m^{th}$ receiving antenna and the $k^{th}$ UE when two symbols are reserved for SRS.

FIG. 9 shows an example of two symbols 20, 21 reserved for SRS transmission, where usable subcarriers are divided into two subsets, i.e., the first subcarriers set 18 and the second subcarriers set 19. Suppose that the $k^{th}$ UE belongs to the first subcarriers set with $N_p$ subcarriers denoted by $\Omega_k = \{i_1, \ldots, i_{N_p}\}$. FIG. 10 shows the channel coefficient between the $m^{th}$, m=1, ..., M, receiving antenna at the BS and a transmitting antenna of the $k^{th}$ UE. Similarly to FIG. 9, two symbols 20, 21 are reserved for SRS transmission, where usable subcarriers are divided into two subsets, i.e., the first subcarriers set 18 and the second subcarriers set 19. When the BS receives signals on allocated subcarriers of the $k^{th}$ UE, it estimates the channel coefficient as $\tilde{H}_{m,k,l}$ and $\tilde{H}_{m,k,l}^2$, l=1, ..., $N_p$, and m=1, ..., M, on the $l^{th}$ subcarrier of the first and second SRS symbols respectively by methods such as in [5]. In order to estimate the frequency offset of the $k^{th}$ UE, the BS first computes the correlation value $$R_{FO,k} = \sum_{m=1}^{M} \sum_{l=1}^{N_p} \tilde{H}_{m,k,l}^{1,*} \tilde{H}_{m,k,l}^2. \quad (5)$$

Then, the BS estimates the equivalent phase of frequency offset as $$\hat{\theta}_{FO,k} = \frac{N_{fft}}{N_s} \arg(R_{FO,k}), \quad (6)$$

where $N_s$ is the number of samples between the two SRS symbols. For the time offset, similarly to the one SRS symbol case, it depends on the physical distribution of antennas which is described below.

For a centralized antenna MIMO system, the BS first computes the correlation value $$R_{TO,k} = \sum_{t=1}^{2} \sum_{m=1}^{M} \sum_{l=1}^{N_p-\Delta} \tilde{H}_{m,k,l}^{t,*} \tilde{H}_{m,k,l+\Delta}^t, \quad (7)$$

where $\Delta$ is a positive integer, e.g., 1 or 2. Then, the BS estimates the equivalent phase of time offset as $$\hat{\theta}_{TO,k} = \beta \arg(R_{TO,k}), \quad (8)$$

where $\beta$ is a scaling factor and can be chosen as $$\frac{N_{fft}}{2\pi\Delta}, \Delta = i_{l+1} - i_l.$$

For a distributed antenna MIMO system, the time offset of each group of antennas needs to be estimated individually. For the $n_{DA}{}^{th}$ group, the correlation value is $$R_{TO,k}^{n_{DA}} = \sum_{t=1}^{2} \sum_{m \in \Omega_{n_{DA}}} \sum_{l=1}^{N_p-\Delta} \tilde{H}_{m,k,l}^{t,*} \tilde{H}_{m,k,l+\Delta}^t, n_{DA} = 1, \ldots, N_{DA}, \quad (9)$$

and the equivalent phase of time offset is estimated as $$\hat{\theta}_{TO,k}{}^{n_{DA}} = \beta \arg(R_{TO,k}{}^{n_{DA}}), n_{DA}=1, \ldots, N_{DA}. \quad (10)$$

With the estimated frequency and time offsets, the estimated channel coefficients are modified. Note that the estimated frequency offset in (6) in an earlier time can be used if only one SRS symbol is reserved for the UE in a subframe. In this case, the modifications of the estimated channel coefficients are realized depending on the antennas' physical distribution.

For centralized antenna systems, with $\hat{\theta}_{FO,k}$ and $\hat{\theta}_{TO,k}$, the estimated channel coefficients are modified as $$\hat{H}_{m,k,l} = \tilde{H}_{m,k,l} e^{-\frac{j2\pi\beta i_l \hat{\theta}_{TO,k}}{N_{fft}}} e^{j t_{SRS} \hat{\theta}_{FO,k}}, l = 1, \ldots, N_p, \quad (11)$$

$$m = 1, \ldots, M,$$

where $t_{SRS}$ denotes the SRS symbol index in the subframe.

For distributed antenna systems, with $\hat{\theta}_{FO,k}$ and $\hat{\theta}_{TO,k}{}^{n_{DA}}$, the estimated channel coefficients are modified as $$\hat{H}_{m,k,l} = \tilde{H}_{m,k,l} e^{-\frac{j2\pi\beta i_l \hat{\theta}_{TO,k}^{n_{DA}}}{N_{fft}}} e^{j t_{SRS} \hat{\theta}_{FO,k}}, l = 1, \ldots, N_p, \quad (12)$$

$$m \in \Omega_{n_{DA}}, n_{DA} = 1, \ldots, N_{DA}.$$

In the case where two SRS symbols are reserved for each UE, such as two symbols 20, 21 reserved for SRS transmission as described above with reference to FIG. 9 and FIG. 10, with $\hat{\theta}_{FO,k}$ and $\hat{\theta}_{TO,k}$, the modifications of estimated channel coefficients are realized depending on the antennas' physical distribution.

For centralized antenna systems, with $\hat{\theta}_{FO,k}$ and $\hat{\theta}_{TO,k}$, the estimated channel coefficients are modified as $$\hat{H}_{m,k,l}^1 = \tilde{H}_{m,k,l}^1 e^{-\frac{j2\pi\beta i_l \hat{\theta}_{TO,k}}{N_{fft}}} e^{j t_1 \hat{\theta}_{FO,k}}, l = 1, \ldots, N_p, \quad (13)$$

$$m = 1, \ldots, M,$$

and $$\hat{H}_{m,k,l}^2 = \tilde{H}_{m,k,l}^2 e^{-\frac{j2\pi\beta i_l \hat{\theta}_{TO,k}}{N_{fft}}} e^{j t_2 \hat{\theta}_{FO,k}}, l = 1, \ldots, N_p, \quad (14)$$

$$m = 1, \ldots, M,$$

where $t_1$ and $t_2$ denote the symbol indices of the first and second symbols respectively.

For distributed antenna systems, with $\hat{\theta}_{FO,k}$ and $\hat{\theta}_{TO,k}{}^{n_{DA}}$, the estimated channel coefficients are modified as $$\hat{H}^1_{m,k,l} = \tilde{H}^1_{m,k,l} e^{-\frac{j2\pi\beta i_l \hat{\theta}^{n_{DA}}_{TO,k}}{N_{fft}}} e^{j i_1 \hat{\theta}_{FO,k}}, l = 1, \ldots, N_p, \quad (15)$$
$$m \in \Omega_{n_{DA}}, n_{DA} = 1, \ldots, N_{DA},$$
and
$$\hat{H}^2_{m,k,l} = \tilde{H}^2_{m,k,l} e^{-\frac{j2\pi\beta i_l \hat{\theta}^{n_{DA}}_{TO,k}}{N_{fft}}} e^{j i_2 \hat{\theta}_{FO,k}}, l = 1, \ldots, N_p, \quad (16)$$
$$m \in \Omega_{n_{DA}}, n_{DA} = 1, \ldots, N_{DA}.$$

After the modifications of estimated channel coefficients are completed, the BS calculates the effective channel coefficient between each receiving antenna of the BS and each transmitting antenna of a UE every consecutive $N_{den}$ RBs which include part of the subcarrier subset for SRS. Note that $N_{den}$ can be any positive real-valued numbers, e.g., 0.5, 1, or 2, with $N_{den}N_{sc}$ and $N_{RB}/N_{den}$ being integers and the frequency bandwidth of these $N_{den}$ RBs should be smaller than the coherence bandwidth. Still taking the channel coefficient estimation process with reference back to FIG. 9 and FIG. 10 as an example, supposing that the SRS subcarrier subset is included in $N_{RB}$ RBs, then the BS needs to calculate $$N_{EH} = \left\lceil \frac{N_{RB}}{N_{den}} \right\rceil$$

effective channel coefficients between the $m^{th}$ receiving antenna and the $k^{th}$ UE. For the $n_{EH}^{th}$ effective channel coefficient, it corresponds to the frequency band of subcarrier subset $\Omega_{n_{EH}} = \{i_1, \ldots, i_{N_s}\}$. Then, the BS chooses the modified channel coefficients of the $k^{th}$ UE represented by a subset $\mathcal{H}_{n_{EH}}$, e.g., computed from equations (13) and (14) or (15) and (16), with the subcarrier index l included in the subset $\Omega_{n_{EH}}$. After that, the BS calculates the effective channel coefficient $H_{m,k}^{eff}$ by simply averaging or weight averaging the elements in $\mathcal{H}_{n_{EH}}$. This process is repeated for the M receiving antennas and the results are represented by a M×1 vector $h_{n_{EH},k} = [H_{1,k}^{eff} \ldots H_{M,k}^{eff}]^T$. Then, this process is repeated for the other $N_{EH}-1$ effective vectors and for other UEs. In the end, the BS stores all channel vectors of each UE and the locations of effective channels in the frequency domain, e.g., the RB indices corresponding to each effective channel vector, in the memory.

In the uplink transmission, when the BS receives the superposed uplink data transmission signals from multiple UEs in an uplink subframe, it computes the detection matrix for each MU-MIMO group. Similarly, it also depends on the antenna distribution. The centralized and distributed antenna systems are described respectively below.

For centralized antenna systems, supposing that the resource allocated to a specific MU-MIMO group in which $K_{UL}$ UEs are multiplexed includes $N_{UL}$ RBs, then the BS computes the detection matrices of these $N_{UL}$ RBs by the following process. It first reads out the effective channel vector corresponding to each RB of each UE. Then, it divides these $N_{UL}$ RBs into $N_{DM}$ groups, where each UE has the same effective channel vector on each RB of a group. After that, the BS calculates a detection matrix for each group, e.g., for the $n_{DM}^{th}$ group and the corresponding channel vectors $h_{n_{DM},k}$, $k=1, \ldots, K_{UL}$, the detection matrix is calculated with some specific methods as Conjugate Beamforming: $W_{n_{DM}} = H^H$, (17)

Zero-Forcing: $W_{n_{DM}} = (H^H H)^{-1} H^H$, (18)

Minimum Mean Square Error: $W_{n_{DM}} = (H^H H + \alpha I)^{-1} H^H$, (19)

where $H = [h_{n_{DM},1} \ldots h_{n_{DM},K_{UL}}]$ and $\alpha$ is a designed parameter.

After the detection matrix is obtained, it is modified by the estimated frequency and time offsets according to the location of the RE on which it is applied to. For example, if $W_{n_{DM}}$ is applied to REs with subcarrier indices from $i_1$ to $i_{N_s}$ in the frequency domain and OFDM symbol indices from 1 to $N_{sym}$ in a subframe, then $W_{n_{DM}}$ is modified to $$W_{n_{DM}}^{n,s} = D_{n,s} W_{n_{DM}}, n=1, \ldots, N_s, s=1, \ldots, N_{sym}, \quad (20)$$

where the diagonal matrix $D_{n,s}$ is written as $$D_{n,s} = \begin{bmatrix} e^{\frac{j2\pi\beta(n-1)\hat{\theta}_{TO,1}}{N_{fft}}} e^{j(s-1)\hat{\theta}_{FO,1}} & & \\ & \ddots & \\ & & e^{\frac{j2\pi\beta(n-1)\hat{\theta}_{TO,K}}{N_{fft}}} e^{j(s-1)\hat{\theta}_{FO,K_{UL}}} \end{bmatrix}. \quad (21)$$

For distributed antenna systems, supposing that the resource allocated to a specific MU-MIMO group in which $K_{UL}$ UEs are multiplexed includes $N_{UL}$ RBs, then the BS computes the detection matrices of these $N_{UL}$ RBs by the following process. It first reads out the effective channel vector corresponding to each RB of each UE. Then, it divides these $N_{UL}$ RBs into $N_{DM}$ groups, where each UE has the same effective channel vector on each RB of a group. After that, the BS modifies the effective channel vector of each UE on every subcarrier of each group, e.g., for the $n_{DM}^{th}$ group and the corresponding channel vectors $h_{n_{DM},k}$, $k=1, \ldots, K_{UL}$, the effective channel vectors on each subcarrier in the group are modified as $$h_{n_{DM},n,k}(m) = h_{n_{DM},n,k}(m) e^{\frac{j2\pi\beta(n-1)\hat{\theta}_{TO,k}^{n_{DA}}}{N_{fft}}}, n \in \Omega_{n_{DM}}^{sb}, \quad (22)$$
$$m \in \Omega_{n_{DA}}, n_{DA} = 1, \ldots, N_{DA}, n_{DM} = 1, \ldots, N_{DM},$$

where $\Omega_{n_{DM}}^{sb}$ denotes the subcarrier index subset of the $n_{DM}^{th}$ group. Finally, the detection matrix of the $n^{th}$ subcarrier in the $n_{DM}^{th}$ group is calculated with some specific methods as Conjugate Beamforming: $W_{n_{DM}}^n = H^H$, (23)

Zero-Forcing: $W_{n_{DM}}^n = (H^H H)^{-1} H^H$, (24)

Minimum Mean Square Error: $W_{n_{DM}}^n = (H^H H + \alpha I)^{-1} H^H$, (25)

where $$H = \begin{bmatrix} h_{n_{DM},1}^n & \cdots & h_{n_{DM},K_{UL}}^n \end{bmatrix}.$$

After the detection matrix is obtained, it is modified by the estimated frequency offset according to the location of the RE on which it is applied to, e.g., $W_{n_{DM}}^n$ is applied to REs with the subcarrier index n in the $n_{DM}^{th}$ group in the frequency domain and OFDM symbol indices from 1 to $N_{sym}$ in a subframe. Then, $W_{n_{DM}}^n$ is modified to $$W_{n_{DM}}^{n,s} = D_{n,s} W_{n_{DM}}^n, s=1, \ldots, N_{sym}, \quad (26)$$

where the diagonal matrix $D_{n,s}$ is written as $$D_{n,s} = \begin{bmatrix} e^{j(s-1)\hat{\theta}_{FO,1}} & & \\ & \ddots & \\ & & e^{j(s-1)\hat{\theta}_{FO,K_{UL}}} \end{bmatrix}. \quad (27)$$

The modified detection matrix is applied to each RE and then the signals belonging to each UE are obtained. For the example in [0043], supposing that the received signal vector on the RE with the subcarrier index n and the symbol index s is y, then the data signals can be detected as $x=W_{n_{DM}}^{n,s}y$. After that, these detected signals are sent to demodulator and channel decoder, e.g., Turbo decoder, for further processing.

Figure 11:
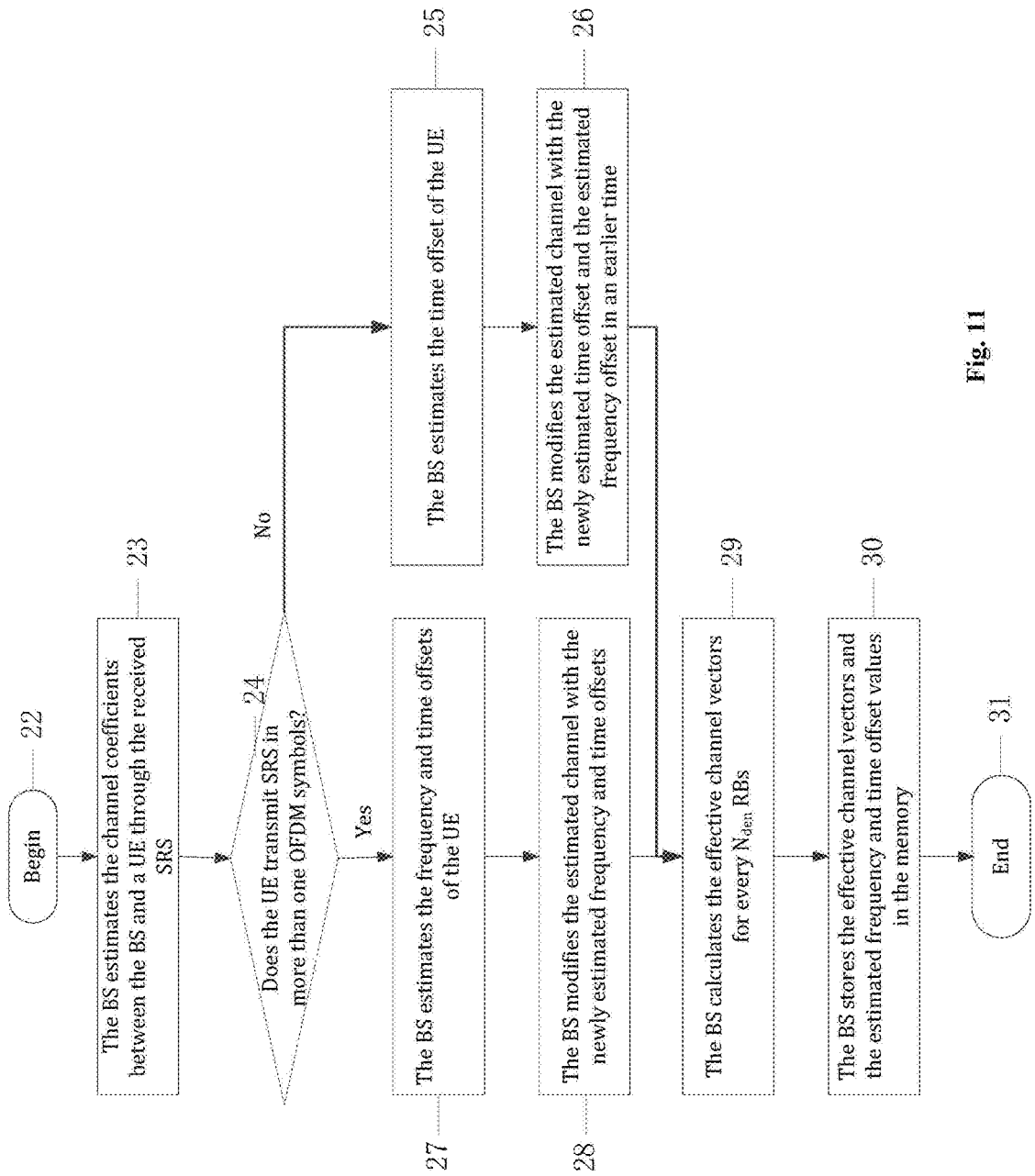
FIG. 11 illustrates a method for channel information acquisition in this patent.

The process of channel estimation and modification is summarized in FIG. 11. It begins 22 when the BS estimates the channel coefficients between the BS and a UE through the received SRS 23. Next, the BS needs to figure out whether the UE transmits SRS in more than one OFDM symbols 24. If SRS is transmitted in one OFDM symbol, the BS estimates the time offset 25 and modifies the estimated channel with the newly estimated time offset and the estimated frequency offset in an earlier time 26. If SRS is transmitted in more than one OFDM symbols, the BS estimates the frequency offset and time offset of the UE 27 and modifies the estimated channel with the newly estimated frequency and time offsets 28. After that, the BS calculates the effective channel vectors every $N_{den}$ RBs 29. Finally, the BS stores the effective channel vectors and the estimated frequency and time offset values in the memory 30 and the process ends 31.

Figure 12:
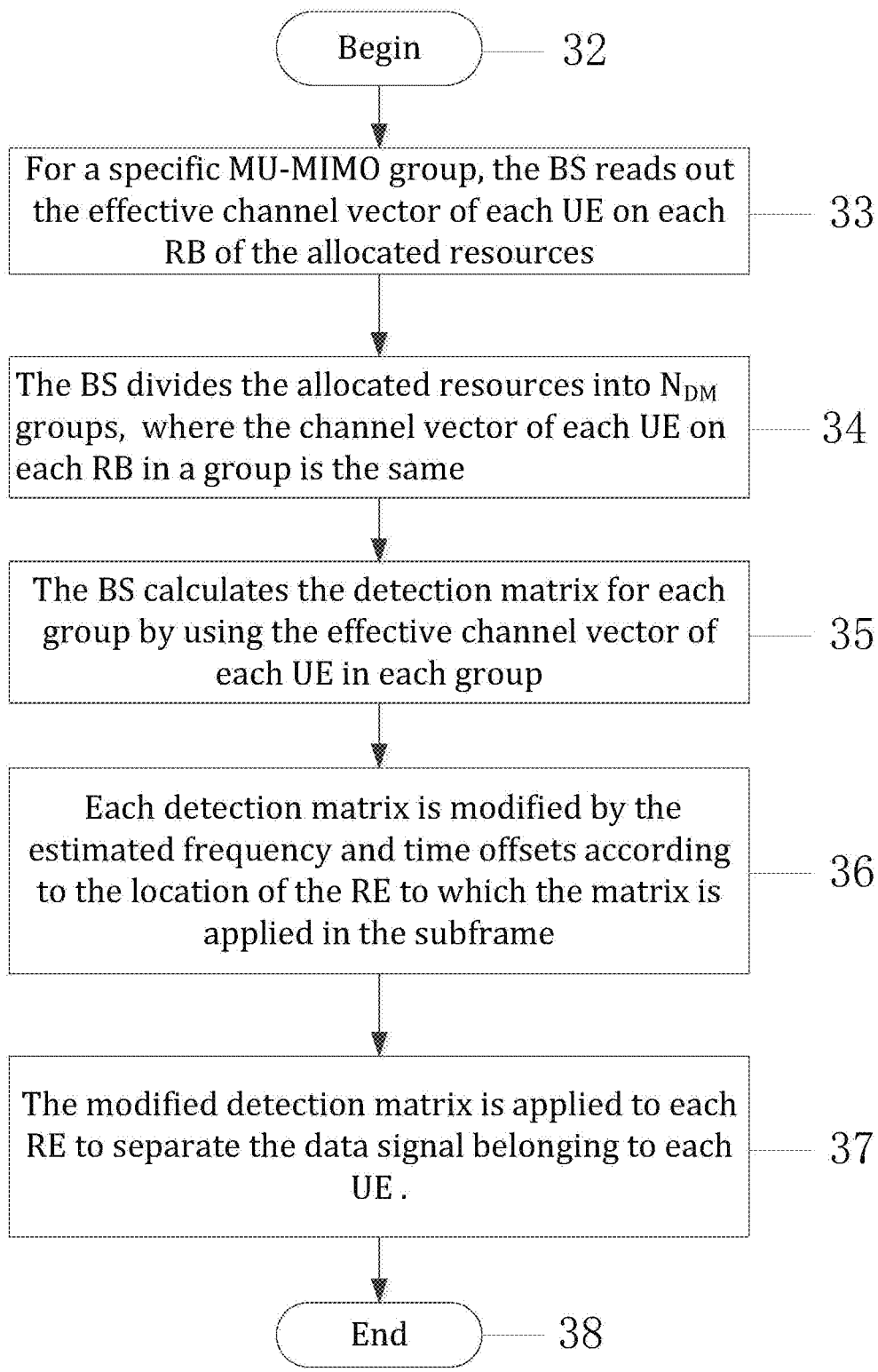
FIG. 12 illustrates a method for detection matrix computation and application for centralized antenna systems.

The process of detection matrix and application is summarized in FIG. 12 for centralized antennas systems. It begins 32 when the BS reads out the effective channel vector of each UE on each RB of the allocated resources for a specific MU-MIMO group 33. Then, the BS divides the allocated resources into $N_{DM}$ groups, where the channel vector of each UE on each RB in a group is the same 34. Then, the BS calculates the detection matrix for each group by using the effective channel vector of each UE in each group 35. After that, each detection matrix is modified by the estimated frequency and time offsets according to the location of the RE to which the matrix is applied in the subframe 36. Finally, the modified detection matrix is applied to each RE to separate the data signals belonging to each UE 37 and the process ends 38.

Figure 13:
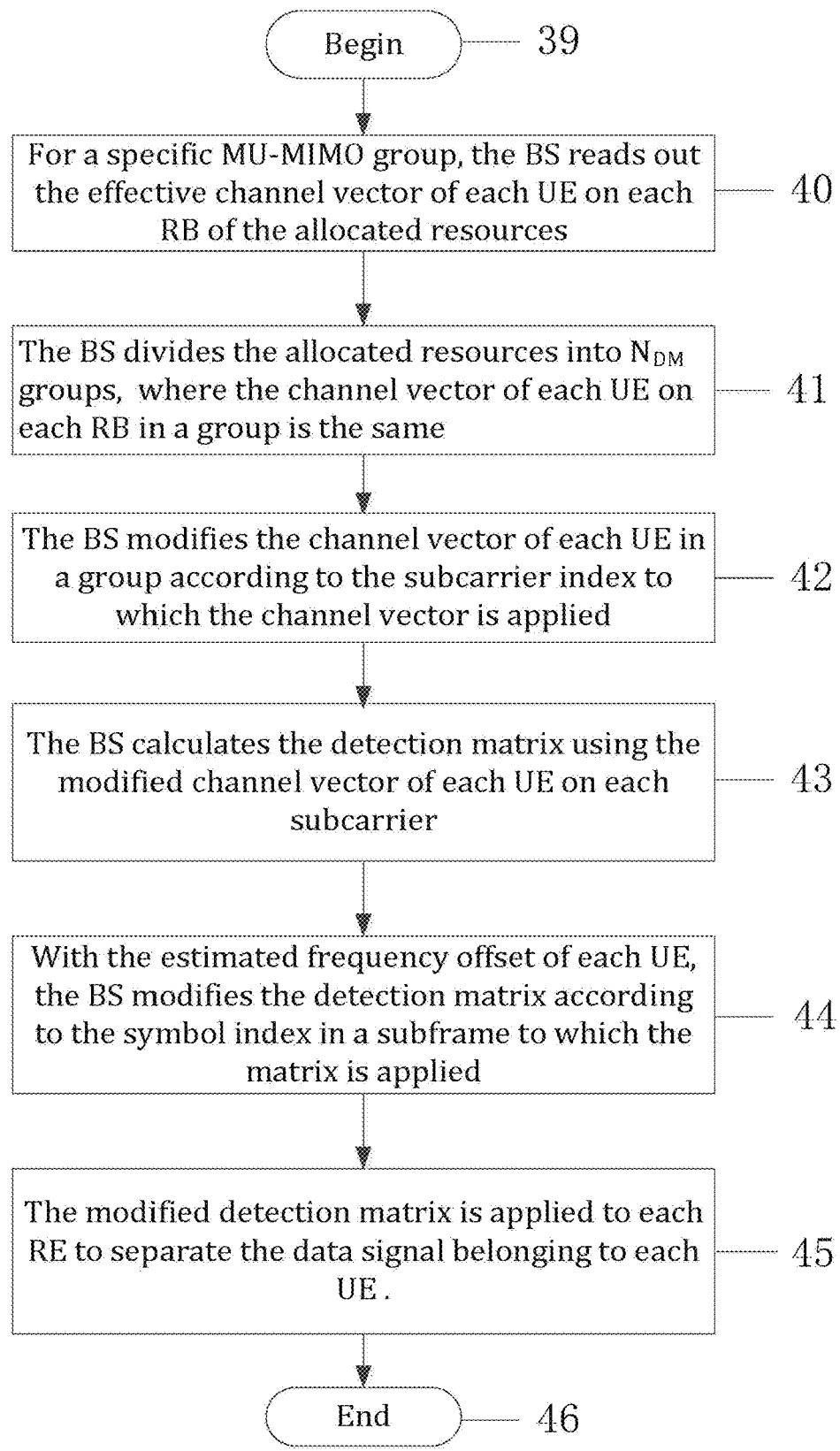
FIG. 13 illustrates a method for detection matrix computation and application for distributed antenna systems.

The process of detection matrix and application is summarized in FIG. 13 for distributed antennas systems. It begins 39 when the BS reads out the effective channel vector of each UE on each RB of the allocated resources for a specific MU-MIMO group 40. Then, the BS divides the allocated resources into $N_{DM}$ groups, where the channel vector of each UE on each RB in a group is the same 41. Next, the BS modifies the channel vector of each UE in a group with the estimated time offset of each UE according to the subcarrier index to which the channel vector is applied 42. After that, the BS calculates the detection matrix using the modified channel vector of each UE on each subcarrier 43. Then, with the estimated frequency offset of each UE, the BS modifies the detection matrix according to the symbol index in a subframe to which the matrix is applied 44. Finally, the modified detection matrix is applied to each RE to separate the data signals belonging to each UE 45 and the process ends 46.

If some REs are reserved for pilots in RBs which are allocated for data transmission in the uplink, the BS would estimate the channel coefficients between itself and the UE first, and then it modifies them with the estimated frequency and time offsets according to the locations of pilots in a subframe. After that, the modified channel coefficients are used to compute the effective channel vectors of the UE and this process is the same as that for the M receiving antennas, and repeated for the other $N_{EH}-1$ effective vectors and for other UEs, as described above. Finally, the results are used to update the channel vectors which correspond to the same frequency band stored in the BS's memory.

In the downlink transmission, the BS computes the precoding matrices for each MU-MIMO group on the allocated RBs in a subframe and then applies them to precode the data from modulator on each RE. For example, if the resource allocated to a specific MU-MIMO group in which $K_{DL}$ UEs are multiplexed includes $N_{data}$ RBs, then the BS computes the precoding matrices of these $N_{data}$ RBs by the following process. It first reads out the effective channel vector corresponding to each RB of each UE. Then, it divides these $N_{data}$ RBs into $N_{PM}$ groups, where each UE has the same effective channel vector on each RB of a group. After that, the BS calibrates the channel vector of each UE, e.g., for the $n_{PM}^{th}$ group, $n_{PM}=1\ldots,N_{PM}$, the corresponding effective channel vectors $h_k$, $k=1,\ldots,K_{DL}$, is calculated as $$H_{PM,k}(m)=b_m H_k, k=1,\ldots,K_{DL}, M=1,\ldots,M, \quad (28)$$

where $b_m$ is the calibrating factor for the $m^{th}$ antenna. After that, the BS calculates the precoding matrix for each group, e.g., the precoding matrix for the $n_{PM}^{th}$ group, $n_{PM}=1\ldots,N_{PM}$, is calculated with some specific methods as Conjugate Beamforming: $W_{n_{PM}}=H^*$, (29)

Zero-Forcing: $W_{n_{PM}}=H^*(H^T H^*)^{-1}$, (30)

Minimum Mean Square Error: $W_{n_{PM}}=H^*$
$(H^T H^*+\alpha I)^{-1}$, (31)

where $H=[h_{PM,1}\ldots h_{PM,K_{DL}}]$. After the precoding matrix is obtained, it is modified by the estimated frequency offset according to the location of the RE on which it is applied to, e.g., $W_{n_{PM}}^n$ is applied to REs with the subcarrier index n in the $n_{PM}^{th}$ group in the frequency domain and OFDM symbol indices from 1 to $N_{sym}$ in a subframe. Then, $W_{n_{PM}}$ is modified to $$W_{n_{PM}}^{n,s}=D_{n,s}^{DL}W_{n_{PM}}, s=1,\ldots,N_{sym}, \quad (32)$$

where the diagonal matrix $D_{n,s}^{DL}$ is written as $$D_{n,s}^{DL} = \begin{bmatrix} e^{-j(s-1)\hat{\theta}_{FO,1}} & & \\ & \ddots & \\ & & e^{-j(s-1)\hat{\theta}_{FO,K_{DL}}} \end{bmatrix}. \quad (33)$$

Finally, the precoding matrix is applied to the RBs belonging to the $n_{PM}^{th}$ group.

Figure 14:
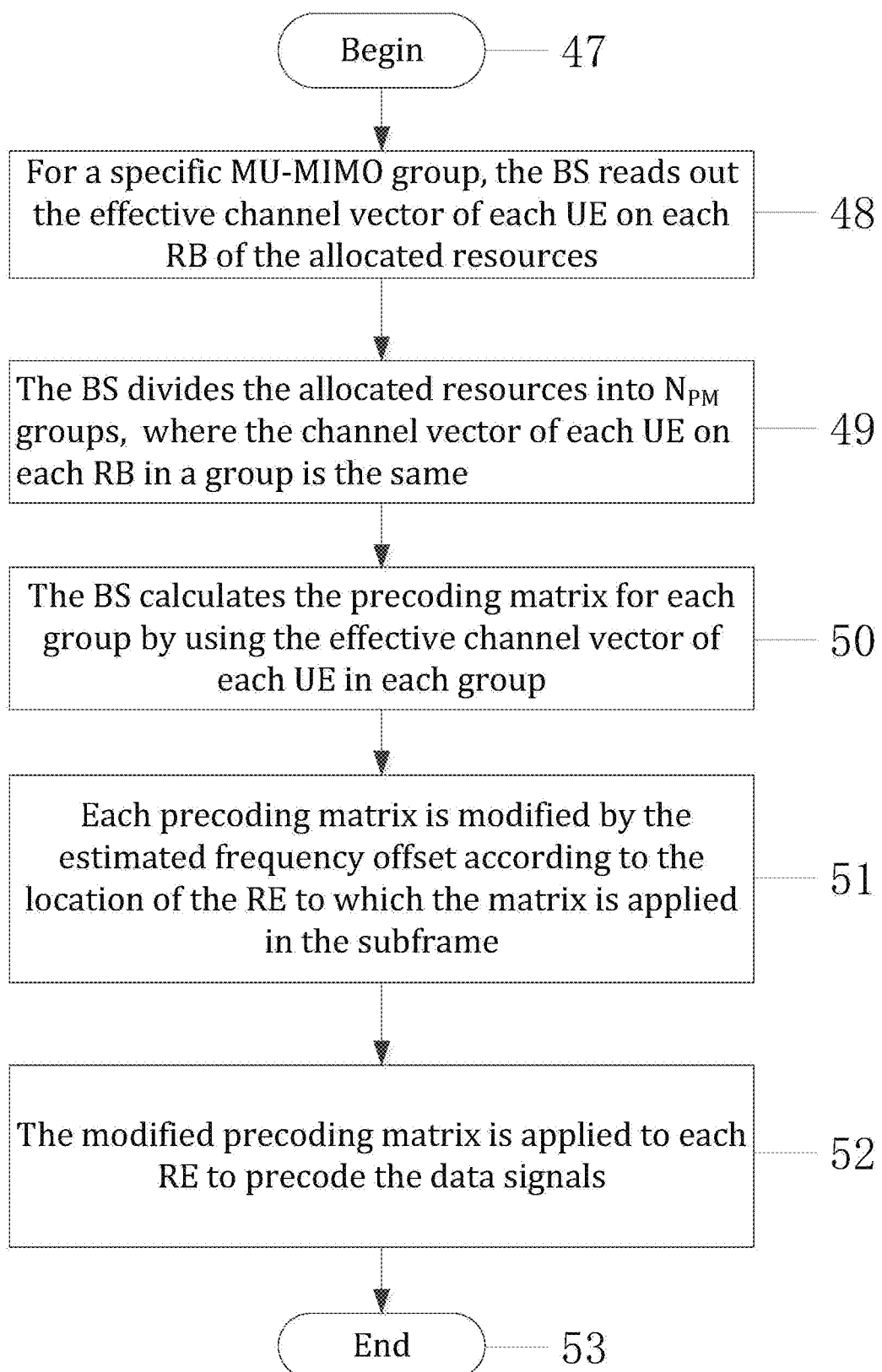
FIG. 14 illustrates a method for precoding matrix computation and application for both centralized and distributed antenna systems in the downlink.

The processing steps of this method are summarized in FIG. 14. It begins 47 when the BS reads out the effective channel vector of each UE on each RB of the allocated resources for a specific MU-MIMO group 48. Then, the BS divides the allocated resources into $N_{PM}$ groups, where the channel vector of each UE on each RB in a group is the same 49. Next, The BS calculates the precoding matrix for each group by using the effective channel vector of each UE in each group 50. After that, each precoding matrix is modified by the estimated frequency offset according to the location of the RE to which the matrix is applied in the subframe 51. Finally, the modified precoding matrix is applied to each RE to precode the data signals 52 and the process ends 53.

Although the foregoing descriptions of the preferred embodiments of the present inventions have shown, described, or illustrated the fundamental novel features or principles of the inventions, it is understood that various omissions, substitutions, and changes in the form of the detail of the methods, elements or apparatuses as illustrated, as well as the uses thereof, may be made by those skilled in the art without departing from the spirit of the present inventions. Hence, the scope of the present inventions should not be limited to the foregoing descriptions. Rather, the principles of the inventions may be applied to a wide range of methods, systems, and apparatuses, to achieve the advantages described herein and to achieve other advantages or to satisfy other objectives as well.

REFERENCE

[1]. T. L. Marzetta, "Noncooperative Cellular Wireless with Unlimited Numbers of Base Station Antennas," *IEEE Trans. Wireless Commun.*, vol. 9, no. 11, pp. 3590-3600, November 2010.

[2]. F. Rusek, D. Persson, B. K. Lau, E. G. Larsson, T. L. Marzetta, O. Edfors, and F. Tufvesson, "Scaling up MIMO: Opportunities and Challenges with Very Large Arrays," *IEEE Signal Process. Mag.*, vol. 30, no. 1, pp. 40-46, January 2013.

[3]. E. G. Larsson, F. Tufvesson, O. Edfors, and T. L. Marzetta, "Massive MIMO for Next Generation Wireless Systems," *IEEE Commun. Mag.*, vol. 52, no. 2, pp. 186-195, February 2014.

[4]. A. Adhikary, J. Nam, J.-Y. Ahn, and, G. Caire, "Joint Spatial Division and Multiplexing—The Large-Scale Array Regime," *IEEE Trans. Inf. Theory*, vol. 59, no. 10, pp. 6441-6463, October 2013.

[5]. X. Hou, Z. Zhang, H. Kayama, "DMRS Design and Channel Estimation for LTE-Advanced MIMO Uplink," in *Proc. IEEE VTC 2009-Fall*, Anchorage, Ak., USA, September 2009.

What are claimed are:

1. A method for signal detection and transmission in Multi-User Multiple-Input Multiple-Output (MU-MIMO) wireless communication systems comprising a Base Station (BS) estimating the channel coefficients of multiple User Equipment (UEs) with a received SRS transmitted at the subcarrier set of one or more symbols in a subframe; the BS estimating the frequency offset and time offset of multiple UEs using SRS transmitted in more than one symbols; the BS modifying the estimated channel coefficients using the estimated frequency offset and time offset; the BS calculating the detection matrices for uplink MU-MIMO signal detection using the modified channel coefficients; and the BS calculating the precoding matrices for downlink MU-MIMO signal transmission,
   further comprising the BS with multiple distributed antenna arrays compensating the time offset of the effective channel coefficients corresponding to a specific antenna subgroup using the estimated time offset, and the BS calculating the MU-MIMO signal detection matrices with the effective channel coefficients after time offset compensation for an uplink signal transmission.

2. A method for signal detection and transmission in Multi-User Multiple-Input Multiple-Output (MU-MIMO) wireless communication systems comprising a Base Station (BS) estimating the channel coefficients of multiple User Equipment (UEs) with a received SRS transmitted at the subcarrier set of one or more symbols in a subframe; the BS estimating the frequency offset and time offset of multiple UEs using SRS transmitted in more than one symbols; the BS modifying the estimated channel coefficients using the estimated frequency offset and time offset; the BS calculating the detection matrices for uplink MU-MIMO signal detection using the modified channel coefficients; and the BS calculating the precoding matrices for downlink MU-MIMO signal transmission;
   further comprising the BS with multiple distributed antenna arrays compensating the time offset of the effective channel coefficients corresponding to a specific antenna subgroup using the estimated time offset, and the BS calculating the MU-MIMO signal detection matrices using the effective channel coefficients after time offset compensation for an uplink signal transmission,
   further comprising the BS modifying the detection matrix using the estimated frequency offset according to a specific Orthogonal Frequency-Division Multiplexing (OFDM) symbol index of a subframe to which the detection matrix is applied.

3. A method for signal detection and transmission in Multi-User Multiple-Input Multiple-Output (MU-MIMO) wireless communication systems comprising a Base Station (BS) estimating the channel coefficients of multiple User Equipment (UEs) with a received SRS transmitted at the subcarrier set of one or more symbols in a subframe; the BS estimating the frequency offset and time offset of multiple UEs using SRS transmitted in more than one symbols; the BS modifying the estimated channel coefficients using the estimated frequency offset and time offset; the BS calculating the detection matrices for uplink MU-MIMO signal detection using the modified channel coefficients; and the BS calculating the precoding matrices for downlink MU-MIMO signal transmission;
   further comprising the BS calibrating the modified channel coefficients as in claim 1, and the BS calculating downlink MU-MIMO precoding matrices using the calibrated channel coefficients.

4. A method for signal detection and transmission in Multi-User Multiple-Input Multiple-Output (MU-MIMO) wireless communication systems comprising a Base Station (BS) estimating the channel coefficients of multiple User Equipment (UEs) with a received SRS transmitted at the subcarrier set of one or more symbols in a subframe; the BS estimating the frequency offset and time offset of multiple UEs using SRS transmitted in more than one symbols; the BS modifying the estimated channel coefficients using the estimated frequency offset and time offset; the BS calculating the detection matrices for uplink MU-MIMO signal detection using the modified channel coefficients; and the BS calculating the precoding matrices for downlink MU-MIMO signal transmission;
   further comprising the BS calibrating the modified channel coefficients as in claim 1, and the BS calculating downlink MU-MIMO precoding matrices using the calibrated channel coefficients;
   further comprising the BS modifying the precoding matrices using the estimated frequency offset according to a specific Orthogonal Frequency-Division Multiplexing (OFDM) symbol index of a subframe to which the precoding matrices are applied.

* * * * *